United States Patent
Toyama et al.

(10) Patent No.: US 6,927,803 B2
(45) Date of Patent: Aug. 9, 2005

(54) VIDEO MIXING APPARATUS AND METHOD OF MIXING VIDEO

(75) Inventors: Naoki Toyama, Osaka (JP); Yoshiki Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 633 days.

(21) Appl. No.: 09/850,975

(22) Filed: May 8, 2001

(65) Prior Publication Data

US 2002/0012072 A1 Jan. 31, 2002

(30) Foreign Application Priority Data

May 8, 2000 (JP) ........................................ 2000-134579

(51) Int. Cl.[7] ............................................... H04N 9/74
(52) U.S. Cl. ........................ 348/586; 348/590; 348/591; 382/164; 382/165; 345/629
(58) Field of Search ........................ 348/586–592, 348/578, 585; 382/164–165, 284, 294; 345/629, 114, 115; H04N 9/74

(56) References Cited

U.S. PATENT DOCUMENTS

| | | | |
|---|---|---|---|
| 4,533,937 A | | 8/1985 | Yamamoto et al. |
| 5,251,016 A | | 10/1993 | Delwiche |
| 5,355,174 A | * | 10/1994 | Mishima ................... 348/592 |
| 5,444,496 A | * | 8/1995 | Gehrmann ................ 348/587 |
| 5,630,037 A | * | 5/1997 | Schindler ................. 345/592 |
| 5,719,640 A | * | 2/1998 | Gehrmann ................ 348/587 |
| 5,825,433 A | * | 10/1998 | Yamada et al. ........... 348/584 |
| 5,903,318 A | * | 5/1999 | Demay et al. ............ 348/592 |
| 5,923,381 A | * | 7/1999 | Demay et al. ............ 348/592 |
| 6,201,581 B1 | * | 3/2001 | Moriwake et al. ........ 348/587 |
| 6,288,703 B1 | * | 9/2001 | Berman et al. ........... 345/600 |
| 6,335,765 B1 | * | 1/2002 | Daly et al. ............... 348/586 |
| 6,348,953 B1 | * | 2/2002 | Rybczynski .............. 348/584 |
| 6,525,741 B1 | * | 2/2003 | Klassen et al. ........... 345/589 |
| 6,571,012 B1 | * | 5/2003 | Pettigrew ................. 382/167 |
| 6,621,924 B1 | * | 9/2003 | Ogino et al. ............. 382/165 |
| 6,674,485 B2 | * | 1/2004 | Akiyama et al. ......... 348/586 |
| 6,778,697 B1 | * | 8/2004 | Shin et al. ............... 382/164 |
| 6,778,698 B1 | * | 8/2004 | Prakash et al. ........... 382/164 |
| 2001/0036229 A1 | * | 11/2001 | Chen et al. .......... 375/240.08 |
| 2001/0055028 A1 | * | 12/2001 | Oka ........................ 345/629 |
| 2002/0025066 A1 | * | 2/2002 | Pettigrew ................. 382/162 |
| 2002/0037103 A1 | * | 3/2002 | Hong et al. .............. 382/173 |

FOREIGN PATENT DOCUMENTS

| | | |
|---|---|---|
| JP | 08-153201 | 6/1996 |
| JP | 2556810 | 9/1996 |
| JP | 11-027693 | 1/1999 |

* cited by examiner

Primary Examiner—Brian P. Yenke
(74) Attorney, Agent, or Firm—RatnerPrestia

(57) ABSTRACT

A video mixing apparatus carries out a chromakey process producing less degradation of picture quality by generating a key signal which separates a foreground object component from a screen component by using luminance information. In a three-dimensional color space, a smaller oval body surrounding a region where the foreground object is distributed and a larger oval body surrounding the smaller one are set. These two oval bodies and a distribution of a source video signal determine a key signal distribution. Key signal K=0 (zero) when the source video signal is inside the smaller oval body, and K=1 (one) when the signal is outside the larger oval body. 0<K<1 when the signal is between the smaller and the larger oval bodies. Based on the key signal K generated, the source video signal is mixed with the background video signal.

13 Claims, 17 Drawing Sheets

CbCr Plane

VIDEO MIXING APPARATUS AND METHOD OF MIXING VIDEO

FIELD OF THE INVENTION

The present invention relates to a video mixing apparatus carrying out a chromakey process and a method of the chromakey process.

BACKGROUND OF THE INVENTION

Related arts are disclosed by U.S. Pat. No. 4,533,937 and JP Patented No. 2,556,810. First, the prior art disclosed by U.S. Pat. No. 4,533,937 is described hereinafter. FIG. 12 is a block diagram illustrating a first example of a video mixing apparatus carrying out a conventional chromakey process.

In this first example, a component of a foreground object is taken out from a source video signal, and mixed with background video signal. The source video signal is generated by shooting the foreground object in front of a monochromatic screen. This is known as a chromakey process.

As shown in FIG. 12, this video mixing apparatus performs as follows: Key signal generator 1101 generates key signal K using source video signal Vs and a screen reference color. Screen reference color memory 1102 stores screen reference color Vr designated by a user. Mixing processor 1103 mixes source video signal Vs with background video signal Vz based on key signal K and screen reference color Vr, thereby outputting mixed video signal Vm.

Reference marks Vs, Vz, Vr and Vm are three-dimensional color vectors of which respective luminance component Y, blue color difference component Cb, and red color difference component Cr are (Sy, Scb, Scr), (Zy, Zcb, Zcr), (Ry, Rcb, Rcr), (My, Mcb, Mcr), and reference mark K is a scalar value taking $0 \leq K \leq 1$.

Key signal generator 1101 generates key-signal K, for instance, as follows: Formula (1) indicates distance "d" ($d \geq 0$) on Cb-Cr plane between source video signal Vs and screen reference color Vr. Output signal K is a function of input signal "d" and is saturated by base-clip-level "db" and peak-clip-level "dp". This is shown in formula (2).

$$d = \sqrt{(Scb-Rcb)^2 + (Scr-Rcr)^2} \quad (1)$$

$$K = \text{Clip}(d, db, dp) \quad (2)$$

where function "Clip" in formula (2) produces an output saturated with respect to the input signal at base clip level "b" and peak clip level "p" as shown in FIG. 13. Function "Clip" carries out the following calculations:

i) When $d \leq b$, $\text{Clip}(d,b,p)=0$     (3a)

ii) When $b<d<p$, $\text{Clip}(d,b,p)=((d-b)/(p-b)$     (3b)

iii) When $p \leq d$, $\text{Clip}(d,b,p)=1$     (3c)

An example case, where base-clip-level "db" and peak-clip-level "dp" take constant values, is described hereinafter. Key signal generator 1101, as shown in FIG. 14, generates key signal K based on a distribution where two circles having respective radiuses "db" and "dp" draw boundaries. In other words, regarding distance "d", the following three cases are available:

i) When "d" is inside 140 of the circle having radius "db", K=0.

ii) When "d" is outside 142 of the circle having radius "dp", K=1.

iii) When "d" is at a place other than the above two cases, $0<K=(d-db)/(dp-db)<1$.

As such, in this first example, key signal generator 1101 determines key signal K using only a color difference value of the source video signal.

FIG. 15 shows an example of mixing processor 1103, which mixes source video signal Vs with background video signal Vz based on key signal K, thereby outputting mixed video signal Vm. Adder 1401 finds a component of foreground object by subtracting (1−K)Vr from source video signal Vs, where (1−K)Vr is a screen component calculated by multiplier 1402. Another adder 1404 outputs mixed video signal Vm by adding (1−K)Vz to foreground object component Vf, where (1−K)Vz is a background video component calculated by another multiplier 1403.

In the structure shown in FIG. 15, mixing processor 1103 outputs mixed video signal Vm according to the following formulas (4):

Y component: $My=Sy-(1-K)Ry+(1-K)Zy$     (4a)

Cb component: $Mcb=Scb-(1-K)Rcb+(1-K)Zcb$     (4b)

Cr component: $Mcr=Scr-(1-K)Rcr+(1-K)Zcr$     (4c)

Next, the prior art disclosed by JP Patented No. 2,556,810 is described hereinafter. FIG. 16 is a block diagram illustrating a second example of the conventional video mixing apparatus. This apparatus also carries out the chromakey process. This second example differs from the first one in the following point: Key signal generator 1501 outputs two key signals Kc (color-canceling key signal) and Km (mixing key signal). Mixing processor 1503 calculates the mixing based on the two key signals Kc, Km. In this example, the mixing is carried out according to the following formulas:

Y component: $My=Sy-(1-Km)Ry+(1-Km)Zy$     (5a)

Cb component: $Mcb=Scb-(1-Kc)Rcb+(1-Km)Zcb$     (5b)

Cr component: $Mcr=Scr-(1-Kc)Rcr+(1-Km)Zcr$     (5c)

As formula (5) tells, in this example, color-canceling key signal Kc used for subtracting a color difference component can have a value different from mixing process key signal Km. Thus, it can be set that adding of a background video signal component is carried out in a narrow region on a color space and weakening of a screen color is carried out in a rather greater region. Therefore, at a portion where the screen color mixes into the foreground object, the screen color can be weakened without any transparency in the foreground object.

However, the video mixing apparatus of this example generates a key signal using only color difference information of the source video signal, thus, it sometimes cannot separate properly the foreground object component from the screen component.

Hereinafter described is a way of generating a key signal from the source video shown in FIG. 17. Respective pixels constituting the source video shown in FIG. 17 are projected to a plane vertical to a color difference plane. FIG. 18 shows this projection. The pixels constituting the foreground object are distributed in the vicinity of region F 1701 in FIG. 18, while the pixels constituting the screen are distributed in the vicinity of region X 1702. Between these two regions, the pixels constituting the edge of foreground object are distributed, and the pixels are mixed with both the components of foreground object and the screen.

In this example, it is difficult to set a proper edge (boundary) for generating a key signal. For instance, when a boundary face—separating a region of K=1 and another region of K<1—is set as a boundary face "a" denoted with 1801 in FIG. 19, the component of foreground object is weakened. On the other hand, when the boundary face is set as boundary face "b" denoted with 1802 in FIG. 19, the screen color invades the edge in the mixed video.

In the way discussed above, when the mixing process is carried out by the calculations shown in formulas (4), noises (uneven lighting, scratches, stains, and the like) in the screen appear in the mixed video, thereby lowering the picture quality. This is because vector Vr having a constant value is used as a subtracting vector for removing the screen component.

Basically, in a pixel at which the key signal generator outputs key signal K=0, mixed video signal Vm− background video signal Vz should be satisfied. In other words, regarding a luminance component, the term of Sy−(1−K)Ry in (4a) should take "0" (zero) and My=Zy should be satisfied. However, since the screen has some noises, Sy≠Ry, thus error of Sy−Ry appears in the mixed video.

SUMMARY OF THE INVENTION

The present invention addresses the problems discussed above, and aims to provide a video mixing apparatus which can separate a foreground object from a screen, and a method of the same. According to the present invention, the foreground object and the screen are properly separated taking a luminance component into consideration for reserving more discretion at separation. Further, according to the present invention, a key signal is generated based on a boundary face set in three-dimensional space.

The present invention aims to provide a video mixing apparatus which can remove a screen component including noises.

The video mixing apparatus of the present invention comprises a key signal generator and a screen signal generator. The key signal generator generates a key signal based on a position of a source video signal in a key signal distribution formed by two ovals set in the three-dimensional space.

The key signal generator sets an oval body in key signal distribution in the three-dimensional space including the luminance component. Further, the key signal generator generates a key signal based on a position of a source video signal in the key signal distribution. Thus, the key signal generator can separate properly the foreground object from the screen.

A screen signal generator outputs a screen signal to respective pixels of the source video signal, so that a screen component including noises is removed.

DESCRIPTION OF THE PREFERRED EMBODIMENTS

Exemplary embodiments of the present invention are demonstrated hereinafter with reference to the accompanying drawings.

Exemplary Embodiment 1

Figure 1:
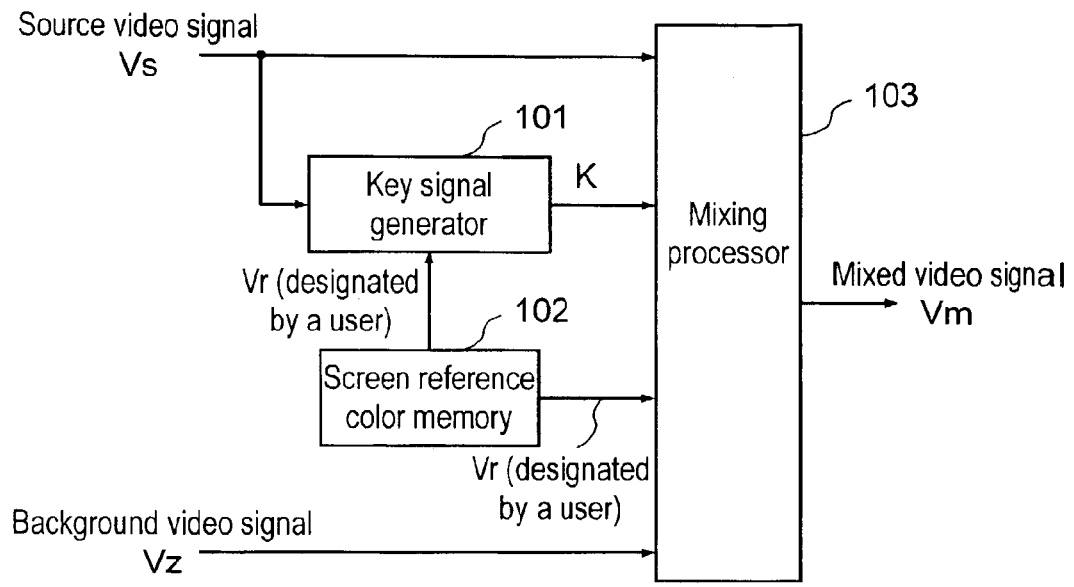
FIG. 1 is a block diagram illustrating a structure of a video mixing apparatus in accordance with a first exemplary embodiment of the present invention.

FIG. 1 is a block diagram illustrating a structure of a video mixing apparatus in accordance with a first exemplary embodiment of the present invention. In FIG. 1, key signal generator 101 generates key signal K using source video signal Vs and screen reference color Vr.

Screen reference color memory 102 stores screen reference color Vr designated by a user.

Mixing processor 103 mixes source video signal Vs with background video signal Vz based on key signal K and screen reference color Vr, thereby outputting mixed video signal Vm.

Reference marks Vs, Vz, Vr and Vm are three-dimensional color vectors of which respective luminance component Y, blue color difference component Cb, and red color difference component Cr are (Sy, Scb, Scr), (Zy, Zcb, Zcr), (Ry, Rcb, Rcr), (My, Mcb, Mcr), and reference mark K is a scalar value taking $0 \leq K \leq 1$.

Mixing processor 103 outputs mixed video signal Vm following the calculations shown by formulas (4) described in the first example of the conventional method. Key signal generator 101 outputs key signal K using the received source signal Vs and screen reference color Vr and following the calculations shown by formulas (6) and (7) below:

$$d1 = \sqrt{t^{2}(Sy-Ry)^{2}+(Scb-Rcb)^{2}+(Scr-Rcr)^{2}} \quad (6)$$

$$K = \text{Clip}(d1, Ar, Ar+Aw) \quad (7)$$

Figure 2:
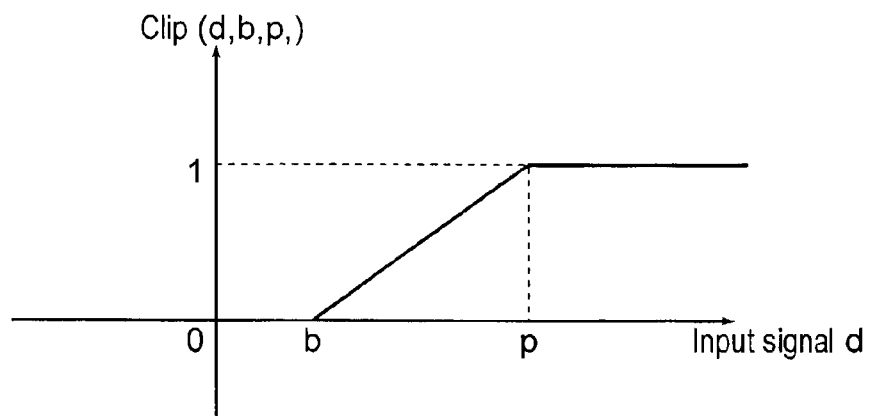
FIG. 2 shows relation of input and output of function Clip (d, b, p).

Function "Clip" shown by formula (7) carries out the calculation shown by formula (3). As shown in FIG. 2, a value saturated at base-clip-level "b" and peak-clip-level "p" is output responding to input signal "d". Parameters "M" "Aw" and "t" are set by a user, and Ar>0, Aw>0, t>0.

Figure 3A:
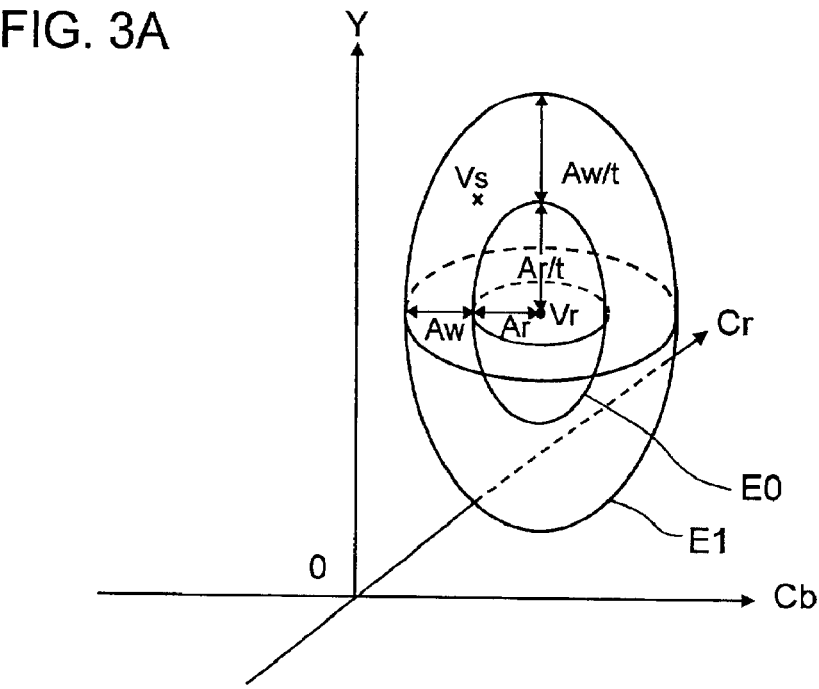
FIGS. 3A and 3B show distribution of key signals in color space, the key signals are generated by a key signal generator in accordance with the first exemplary embodiment of the present invention.

A distribution of key signal K calculated by formulas (6) and (7) is described hereinafter with reference to FIG. 3. FIG. 3A shows the distribution of key signal K in a three-dimensional space having coordinates axes of Y, Cb, Cr.

In FIG. 3, Vs indicates a position of the source video signal supplied in the three-dimensional space, and Vr indicates a position of the screen reference color designated by the user in the three-dimensional space. First oval body E0 has dimensions of center=Vr, a length of shorter axis=Ar, a length of longer axis=Ar/t. Second oval body E1 has dimensions of center=Vr, a length of shorter axis=Ar+Aw, a length of longer axis=(Ar+Aw)/t.

The following formulas (8), (9) represent the first and the second oval body.

$$t^{2}(Y-Ry)^{2}+(Cb-Rcb)^{2}+(Cr-Rcr)^{2}=Ar^{2} \quad (8)$$

$$t^{2}(Y-Ry)^{2}+(Cb-Rcb)^{2}+(Cr-Rcr)^{2}=(Ar+Aw)^{2} \quad (9)$$

where, screen reference color Vr=(Ry, Rcb, Rcr)

Figure 3B:
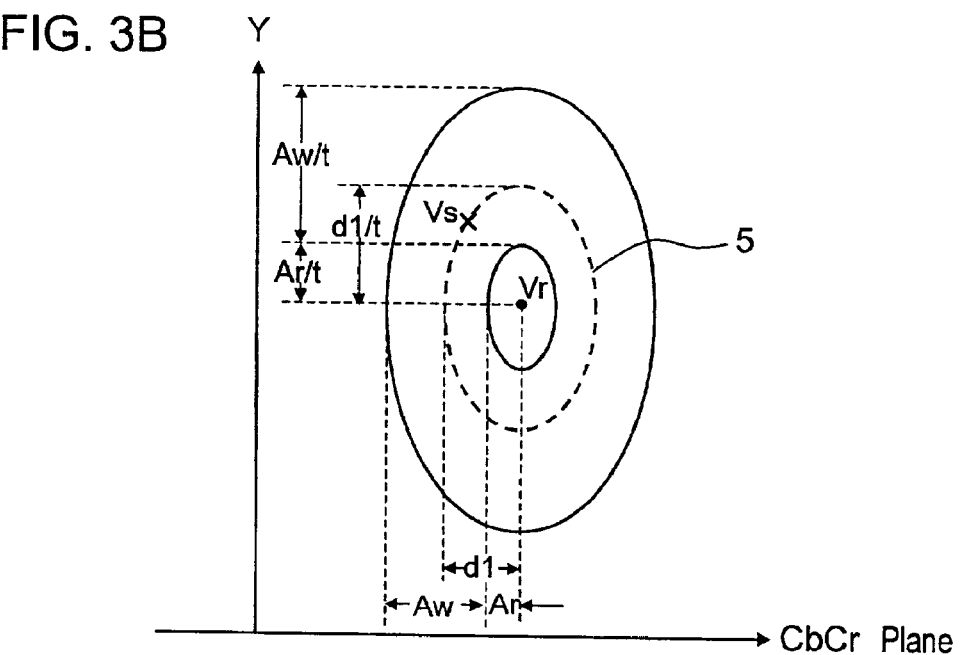

In FIG. 3A, source video signal Vs=(Sy, Scb, Scr). FIG. 3B is a cross section of the oval body taken along a plane passing through Vs, Vr and vertical to Cb–Cr plane.

As shown in FIG. 3B, "d" calculated by formula (6) represents a length of a shorted axis of an oval body which passes through Vs and has a center Vr shown in FIG. 3B, and satisfies the following formula:

shorter axis length/longer axis length=$t(t>0)$

Formula (7) finds key signal K by providing "d1" with a saturation process while Ar is set at a base-clip-level and Ar+Aw is set at a peak-clip-level. In other words, key signal K is determined based on key signal distribution of which equivalent planes form oval bodies having center Vr (screen reference color). As a result, the following key signal distribution shown in FIG. 3A is formed:

i) When Vs is inside oval body E0, K=0.
ii) When Vs is outside oval body E1, K=1.
iii) When Vs is between oval bodies E0 and oval E1, 0<K<1.

A boundary face can be set for separating properly the foreground object from the screen by using oval bodies E0 and E1 shown in FIG. 3A.

Figure 4:
FIG. 4 shows an example of a source video signal.
Figure 5:
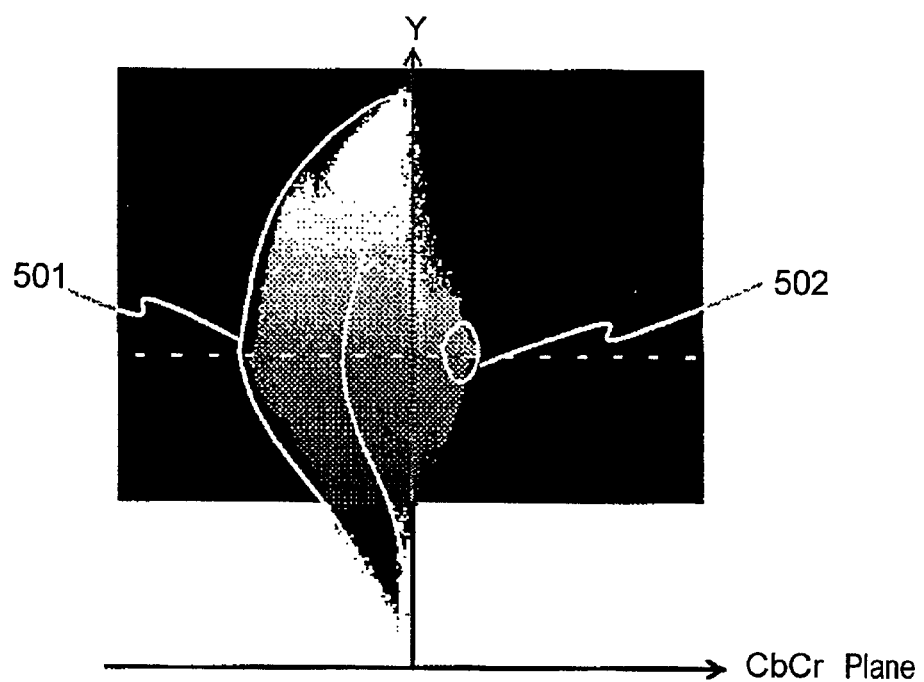
FIG. 5 shows respective pixels projected on a plane vertical to a color difference component plane, the pixels constitute the source video signal.
Figure 6:
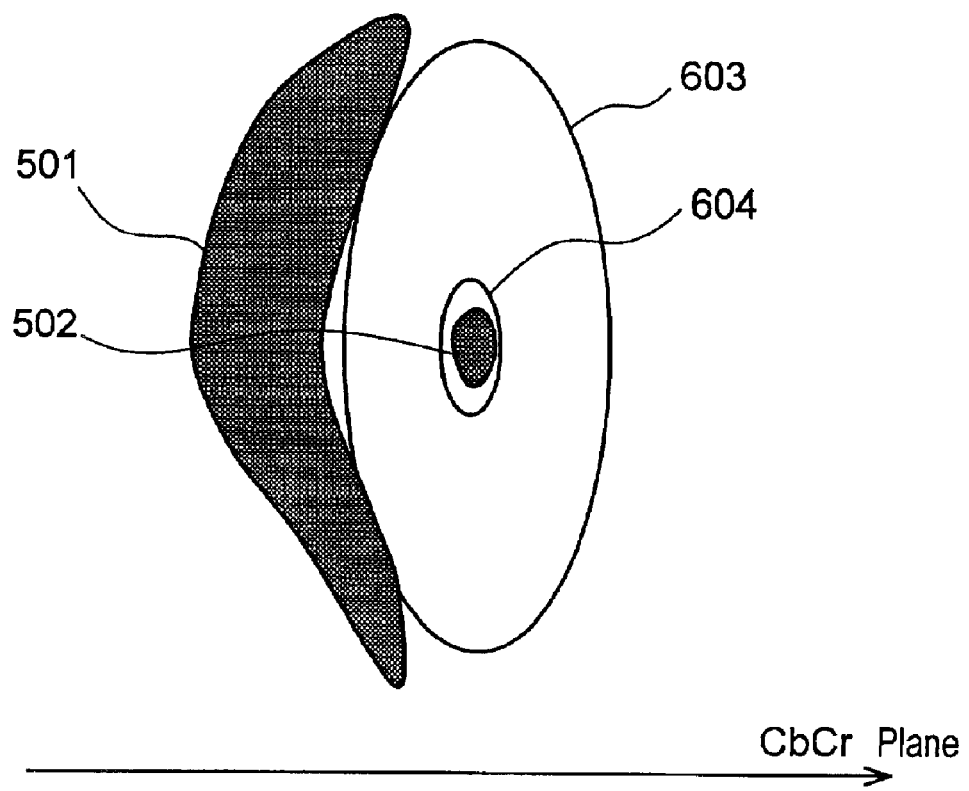
FIG. 6 shows an example of cross sections; cross sections of distribution of pixels constituting a screen and a foreground object respectively, and a cross section of a boundary face specifying distribution of key signals generated by a key signal generator in accordance with the first exemplary embodiment of the present invention.
Figure 7:
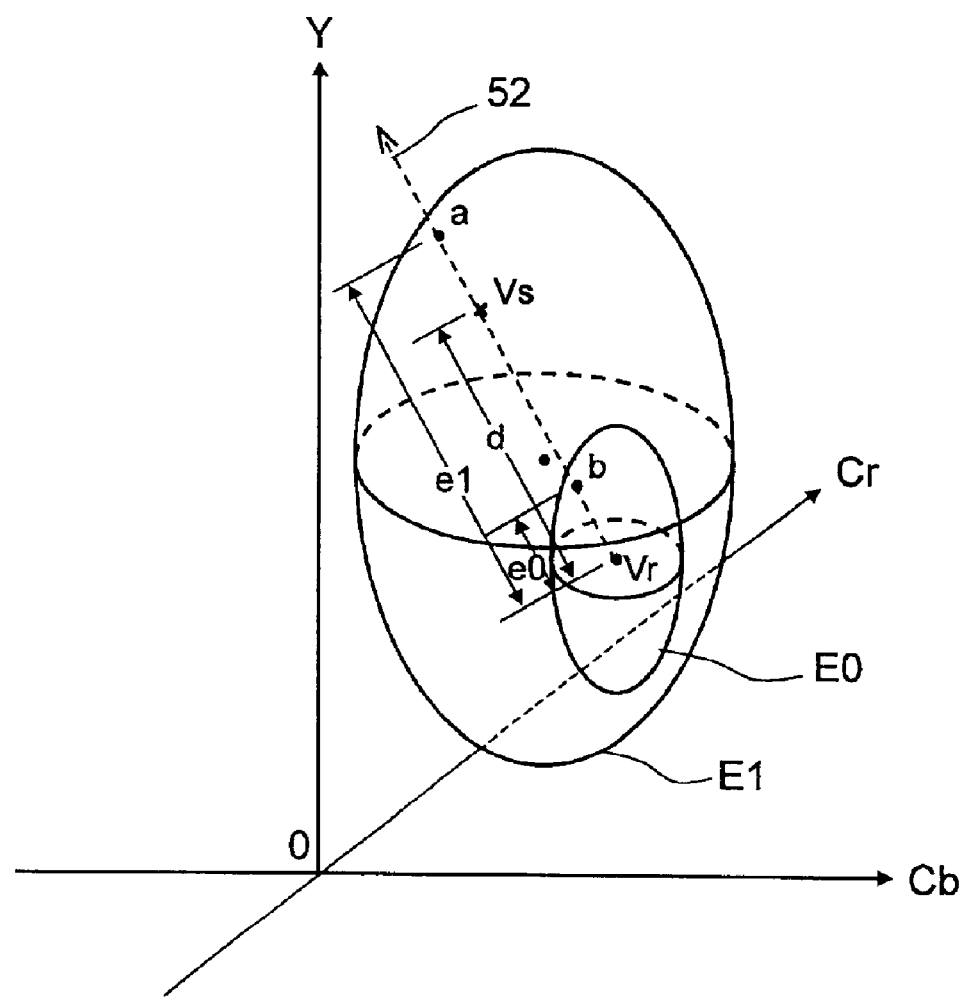
FIG. 7 shows another distribution of the key signal generated by the key signal generator in accordance with the first exemplary embodiment of the present invention.

Here is one example showing the production of a key signal from a source video shown in FIG. 4. FIG. 5 shows respective pixels-constituting the source video shown in FIG. 4—projected on a plane vertical to a color difference component plane. In FIG. 5, the pixels constituting the foreground object are distributed in the vicinity of region F 501, while the pixels constituting the screen are distributed in the vicinity of region X 502. Between these two regions, the pixels constituting the edge of foreground object are distributed, and the pixels are mixed with both the components of foreground object and the screen. In this case, if oval bodies E0 and E1 shown in FIG. 3A are used, boundary faces c 603 and d 604 can be set, so that region F 501 and region X 502 are properly separated. Meanwhile, boundary face c 603 is an oval body surrounding region F 501, and boundary face d 604 is an oval body surrounding boundary face c 603.

A user can arbitrarily set parameters "t", Ar and Aw. These parameters specify a shape of the oval body. Therefore, a proper boundary face can be set responsive to characteristics of the source video signal even when the distribution shown in FIG. 5 is not formed.

As such, due video mixing apparatus in accordance with this embodiment can set a boundary with a plane of an oval body, so that a key signal—properly separating a component of foreground object from a screen component—can be generated. As a result, a mixed video without lowering video quality can be supplied.

In this embodiment, mixed calculations shown by formulas (4) are used, but not limited to formulas (4), and multiplication key type mixed calculations shown by formulas (10) can be used with the same result.

$$Y \text{ component: } My=KSy+(1-K)Zy \quad (10a)$$

$$Cb \text{ component: } Mcb=KScb+(1-K)Zcb \quad (10b)$$

$$Cr \text{ component: } Mcr=KScr+(1-K)Zcr \quad (10c)$$

In this embodiment, the key signal distribution is formed by two oval bodies which share a common center Vr (screen reference color) and also have the same a ratio of shorter axis length vs. longer axis length. It is not limited to these oval bodies, but the key signal distribution can be formed by another two oval bodies having different centers and the different ratios of shorter axis length vs. longer axis length. In this case, vector VrVs 52 starting from screen reference color Vr toward source video signal Vs crosses with oval body E0 at point "b", and distance "e0" between point "b" and Vr is a base-clip-level. Vector VrVs 52 crosses with oval body E1 at point "a", and distance "e1" between point "a" and Vr is a peak-clip-level. Then calculations are carried out so that an output responsive to distance "d" between Vr and Vs is saturated at the base-clip-level and peak-clip-level with respect to distance "d", thereby generating the key signal K.

In this case, the key signal distribution is formed to satisfy the following formulas:

When "$d$"≦"$e0$", then $K=0$.

When "$d$"≧"$e1$", then $K=1$.

When "$e0$"<"$d$"<"$e1$", then $0<K<1$.

This case also brings the same result as discussed previously.

In this embodiment, a video mixing apparatus, which generates a key signal and mixes video using the key signal, is described. The key signal generated can be supplied to a video editing device and the like for further utilization.

(Exemplary Embodiment 2)

In this embodiment, a video mixing apparatus—having a screen signal generator for generating a screen signal—is demonstrated.

Figure 8:
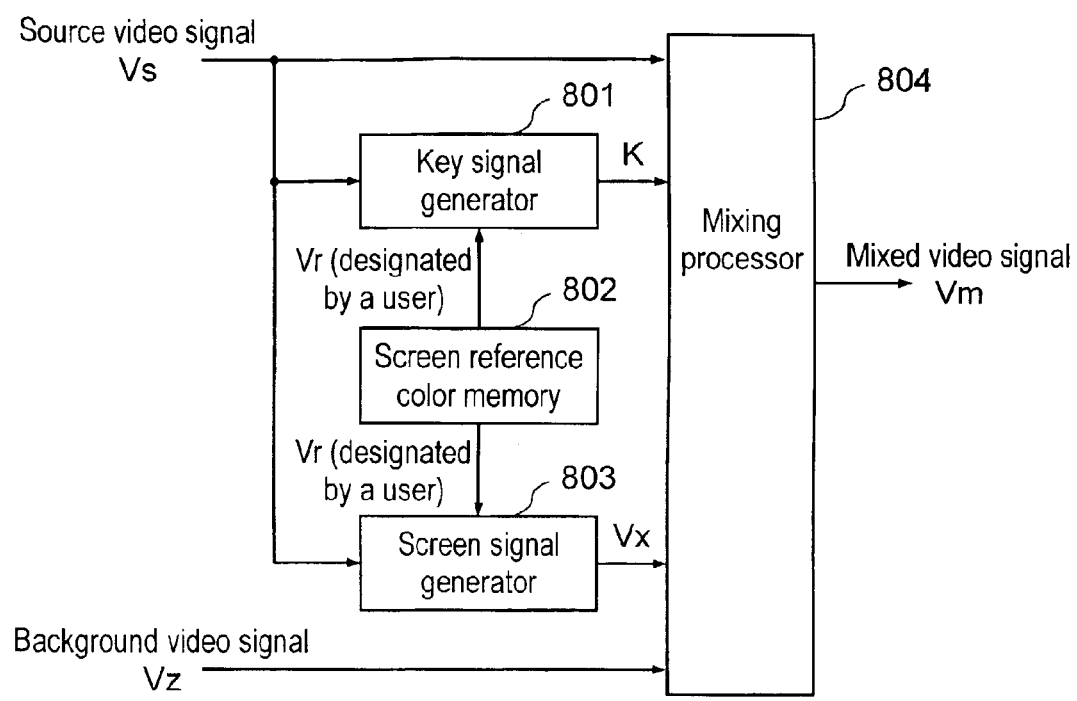
FIG. 8 is a block diagram illustrating a structure of a video mixing apparatus in accordance with a second exemplary embodiment of the present invention.

FIG. 8 is a block diagram illustrating a structure of the video mixing apparatus in accordance with the second exemplary embodiment of the present invention. In FIG. 8, key signal generator 801 generates key signal K using source video signal Vs and screen reference color Vr. Screen reference color memory 802 stores screen reference color Vr designated by a user. Screen signal generator 803 generates screen signal Vx using source video signal Vs and screen reference color Vr. Mixing processor 804 mixes source video signal Vs with background video signal Vz based on key signal K and screen signal Vx, thereby generating mixed video signal Vm.

Reference marks Vs, Vz, Vr, Vx and Vm are three-dimensional color vectors of which respective luminance component Y, blue color difference component Cb, and red color difference component Cr are (Sy, Scb, Scr), (Zy, Zcb, Zcr), (Ry, Rcb, Rcr), (Xy, Xcb, Xcr), (My, Mcb, Mcr), and reference mark K is a scalar value taking $0 \leq K \leq 1$.

Key signal generator 801 outputs key signal K following the calculations shown by formulas (6) and (7) described in the first embodiment. Screen signal generator 803 outputs screen signal Vx using the received source signal Vs and screen reference color Vr and following the calculations shown by formulas (11) and (12) below.

$$d2 = \sqrt{t^2(Sy-Ry)^2 + (Scb-Rcb)^2 + (Scr-Rcr)^2} \qquad (11)$$

i) When $d2 \leq Ar$, $Vx = Vs$ \hfill (12a)

ii) When $d2 \geq Ar$, $Vx = Vr + (Ar/d2)(Vs-Vr)$ \hfill (12b)

Parameters "Ar", "Mv" and "t" are set by a user, and Ar>0, Aw>0, t>0.

Figure 9A:
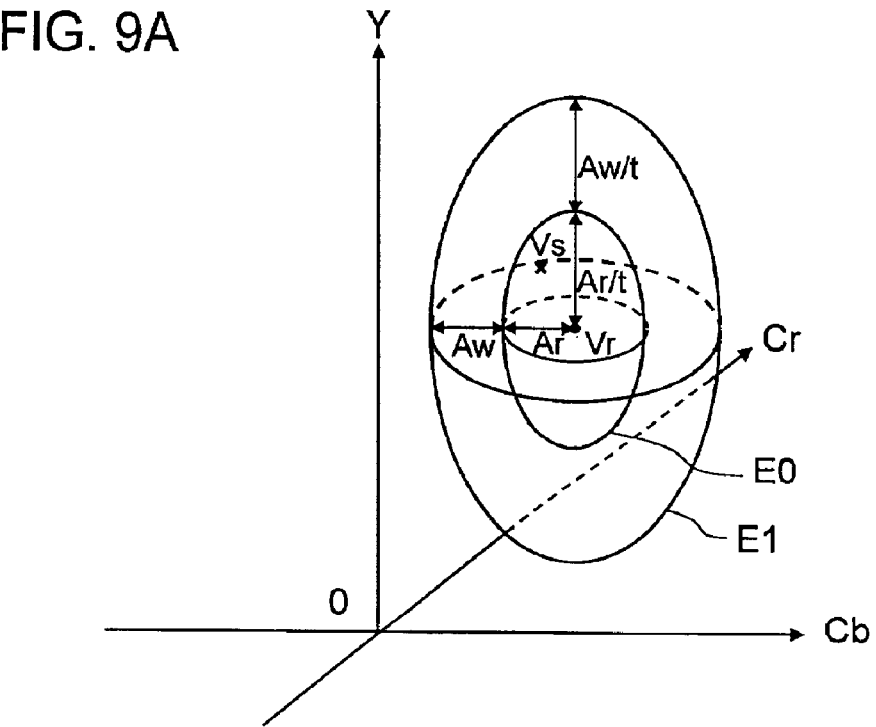
FIGS. 9A and 9B illustrate screen signals generated by a screen signal generator in accordance with the second exemplary embodiment of the present invention.

In other words, as shown in FIG. 9A, when source video signal Vs is inside first oval body E0 and the key signal generator outputs a key signal so that K=0 is satisfied, screen signal generator 803 outputs source video signal Vs as it is.

Figure 9B:
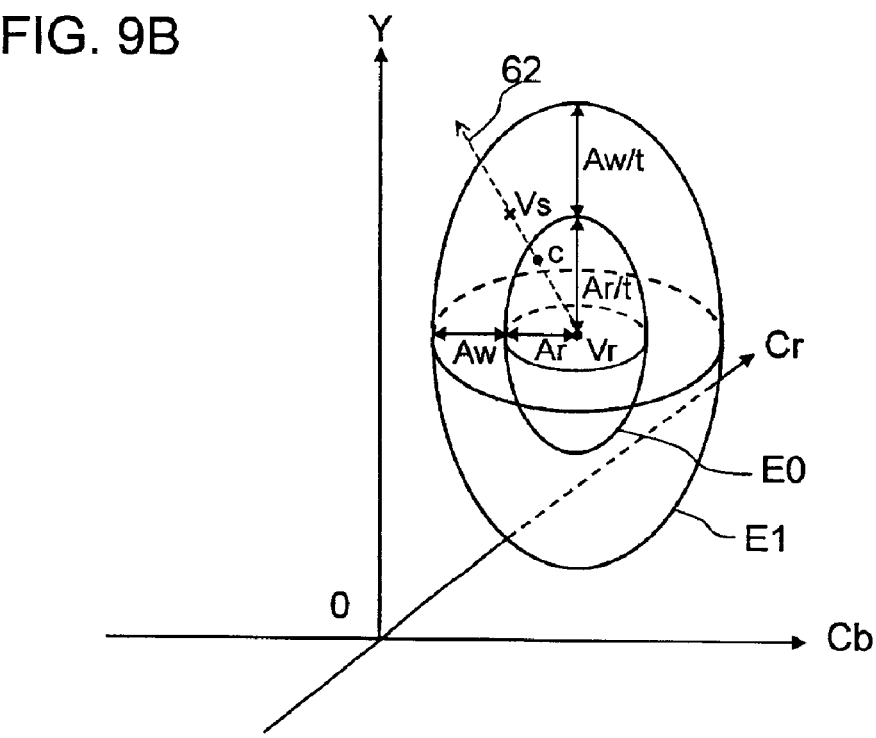

As shown in FIG. 9B, when source video signal Vs is outside oval E0 and he key signal generator outputs a key signal so that K>0 is satisfied, screen signal generator 803 outputs a coordinates value of point "c" as screen signal Vx, where point "c" is a cross point of vector VrVs 62 starting from screen reference color Vr toward source video signal Vs and oval body E0.

Mixing processor 804 carries out a mixing process, based on key signal K supplied from key signal generator 801 and screen signal Vx supplied from screen signal generator 803, following formulas (13).

Y component: $My = Sy - (1-K)Xy + (1-K)Zy$ \hfill (13a)

Cb component: $Mcb = Scb - (1-K)Xcb + (1-K)Zcb$ \hfill (13b)

Cr component: $Mcr = Scr - (1-K)Xcr + (1-K)Zcr$ \hfill (13c)

As such, according to this second embodiment, Vx=Vs is output to the pixels to which key signal generator 801 supplies K=0. A luminance component, i.e., the term of Sy−(1−K)Xy in formula (13a), takes 0 (zero). Therefore, the screen component is completely removed.

In this embodiment the key signal distribution is formed by two oval bodies which share a common center Vr and also have the same ratio of shorter axis length vs. longer axis length. It is not limited to these oval bodies, but the key signal distribution can be formed by another two oval bodies having different centers and different ratios of shorter axis length vs. longer axis length. In this case, Vx=Vs is supplied to source video signal Vs which receives key signal K (K=0), while a coordinates value of the cross point of vector VrVs starting from Vr toward Vs and oval body E0 is supplied as screen signal Vx to source video signal Vs which receives key signal K (K>0).

(Exemplary Embodiment 3)

A video mixing apparatus, of which key signal generator generates two key signals, i.e., a color-canceling key signal and a mixing key signal, is demonstrated in the third embodiment. This apparatus carries out mixing calculations based on the two key-signals and a screen reference color.

Figure 10:
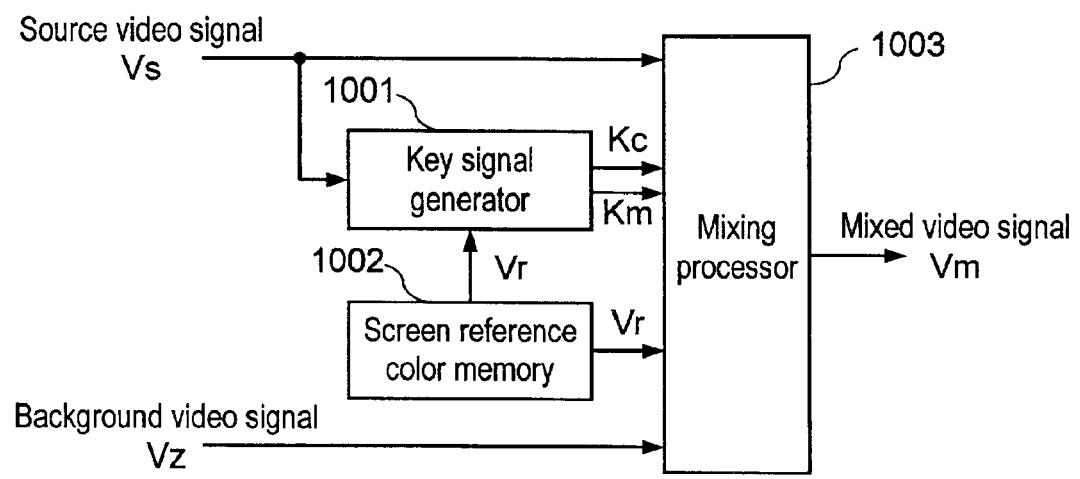
FIG. 10 is a block diagram illustrating a structure of a video mixing apparatus in accordance with a third exemplary embodiment of the present invention.

FIG. 10 is a block diagram illustrating a structure of the video mixing apparatus in accordance with the third exemplary embodiment. In FIG. 10, key signal generator 1001 generates color-canceling key signal Kc and mixing key signal Km using source video signal Vs and screen reference color Vr. Screen reference color memory 1002 stores screen reference color Vr designated by a user. Mixing processor 1003 mixes source video signal Vs with background video signal Vz based on key signals Kc and Km.

Reference marks Vs, Vz, Vr and mixed video signal Vm are three-dimensional color vectors of which respective luminance component Y, blue color difference component Cb, and red color difference component Cr are (Sy, Scb, Scr), (Zy, Zcb, Zcr), (Ry, Rcb, Rcr), (My, Mcb, Mcr), and reference mark Kc and Km are scalar values taking $0 \leq Kc$, $Km \leq 1$.

Key signal generator 1001 outputs color-canceling key signal Kc and mixing key signal Km following formulas (14)–(16).

$$d3 = \sqrt{t^2(Sy-Ry)^2 + (Scb-Rcb)_2 + (Scr-Rcr)^2} \qquad (14)$$

$$Kc = \mathrm{Clip}(d3, Ar, Ar+Aw1) \qquad (15)$$

$$Km = \mathrm{Clip}(d3, Ar, Ar+Aw1+Aw2) \qquad (16)$$

where parameters "Ar", "Aw1", "Aw2" and "t" are set by a user, and Ar>0, Aw1>0, Aw2>0, t>0.

Figure 11:
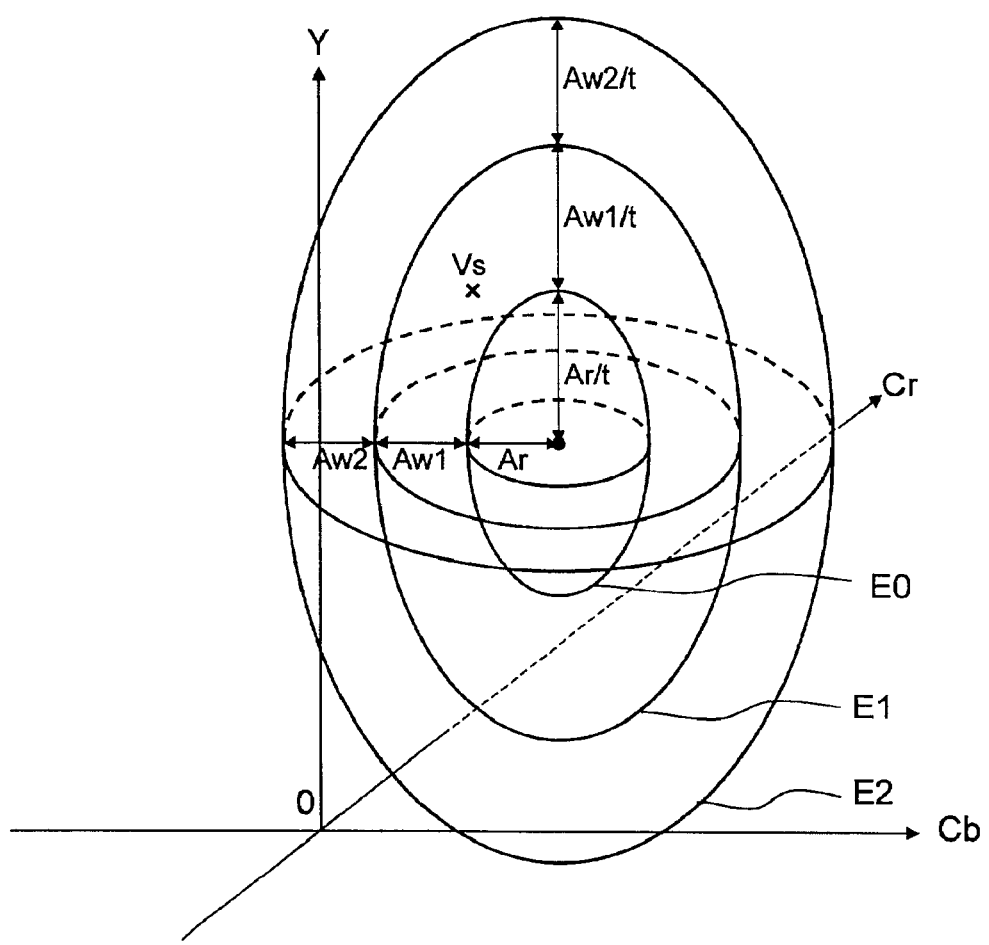
FIG. 11 shows distribution of key signals generated by the key signal generator in accordance with the third exemplary embodiment of the present invention.
Figure 12:
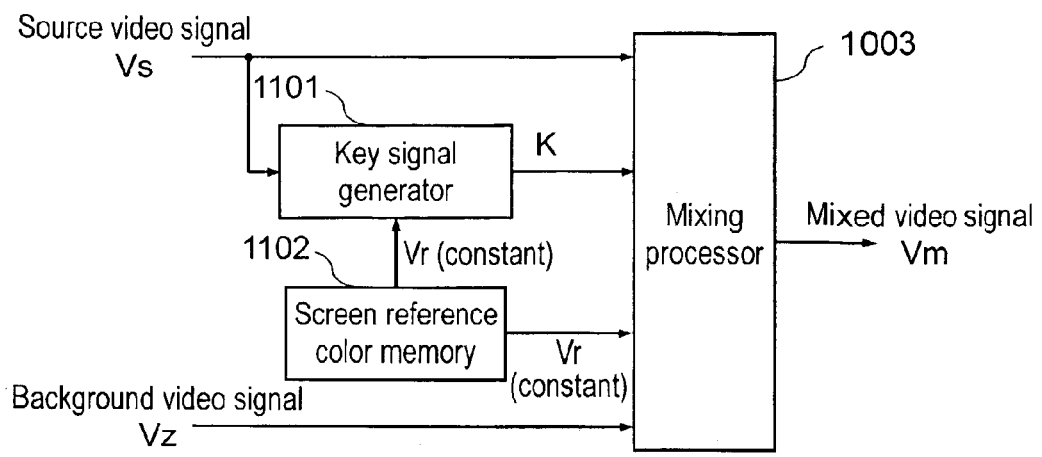
FIG. 12 is a block diagram illustrating a structure of a conventional video mixing apparatus.
Figure 13:
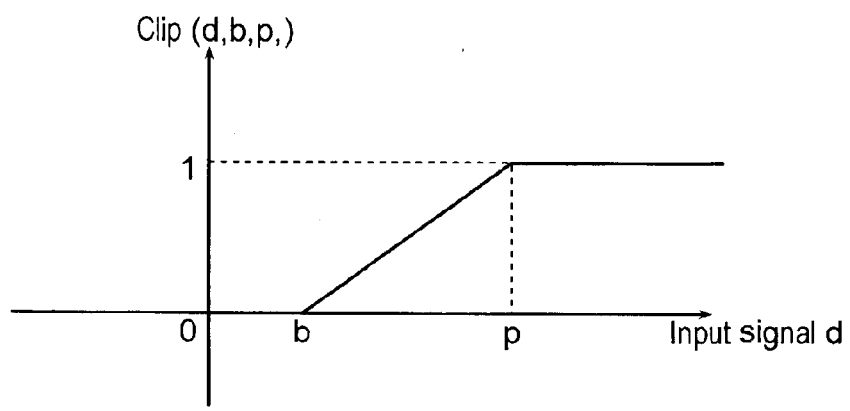
FIG. 13 shows relation of input and output of function Clip (d, b, p).
Figure 14:
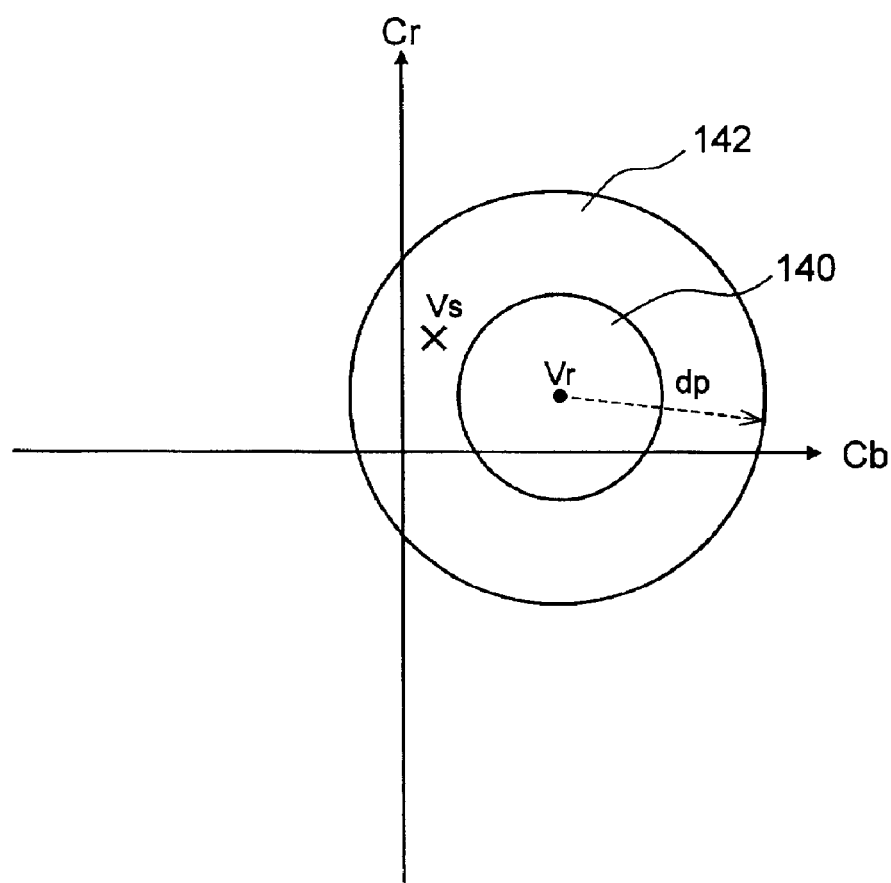
FIG. 14 shows distribution of key signals generated by the conventional key signal generator.
Figure 15:
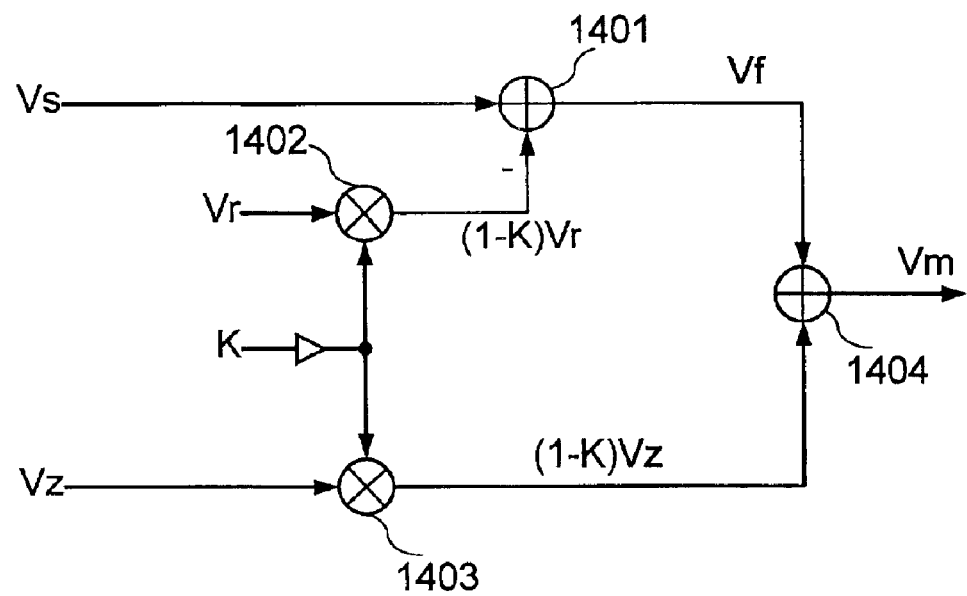
FIG. 15 shows a circuit structure generating mixed video signal Vm using source video signal Vs and background video signal Vz.
Figure 16:
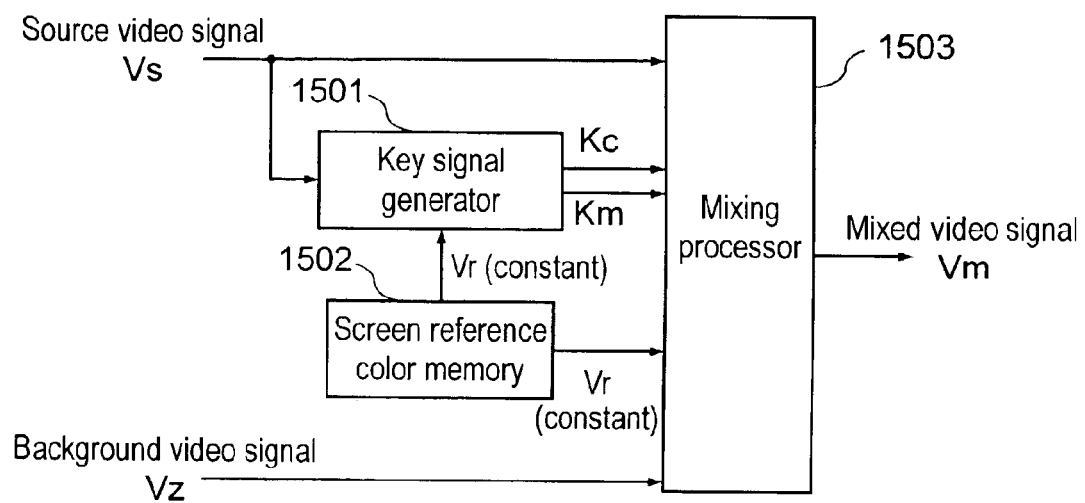
FIG. 16 is a block diagram illustrating another structure of a conventional video mixing apparatus.
Figure 17:
FIG. 17 is an example of a source video signal.
Figure 18:
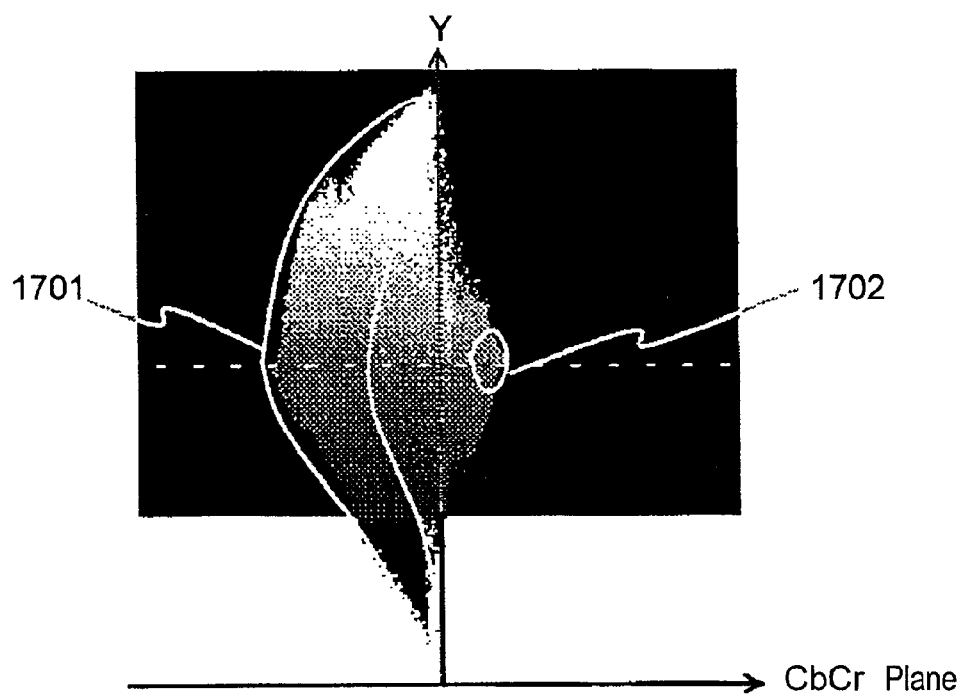
FIG. 18 shows respective pixels constituting the source video signal, the pixels are projected on a plane vertical to a color difference component plane.
Figure 19:
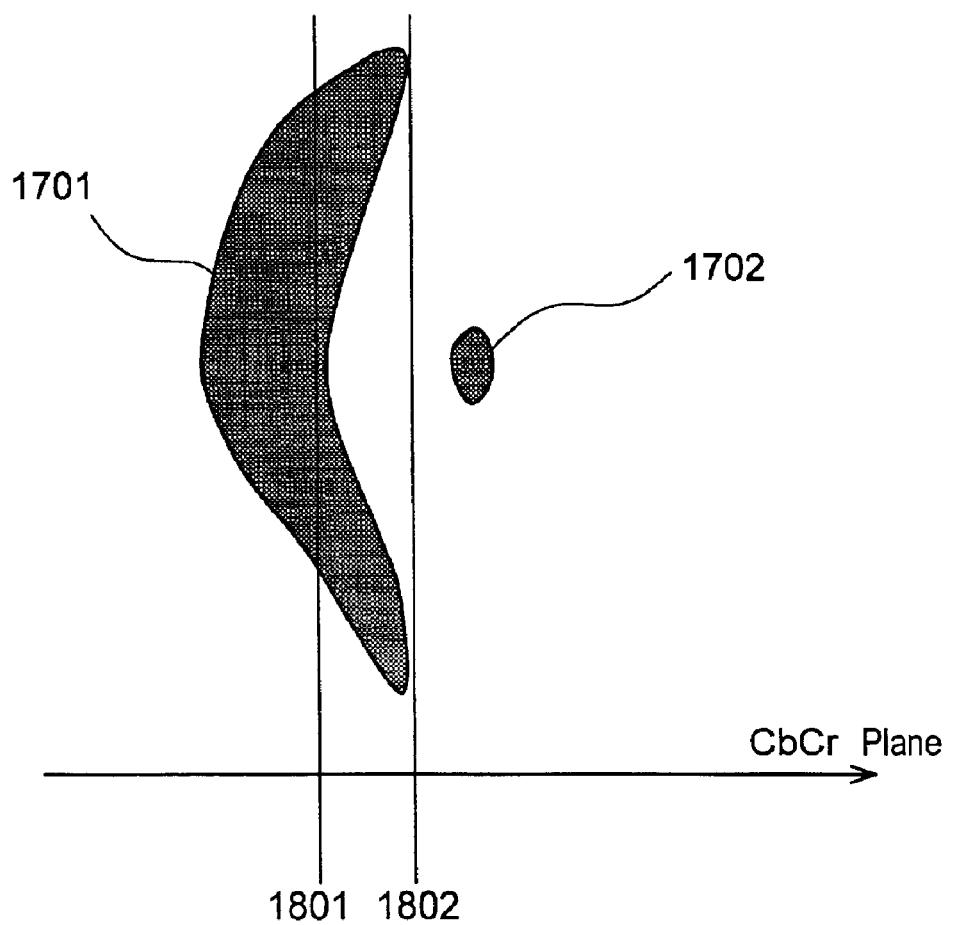
FIG. 19 shows an example of cross sections; cross sections of distribution of pixels constituting a screen and a foreground object respectively, and a cross section of a boundary face specifying distribution of a key signal generated by the conventional key signal generator.

Distributions of color-canceling key signal Kc and mixing key signal Km, both the signals are calculated by formulas (14)–(16), are described with reference to FIG. 11.

In this embodiment, three oval bodies form the distribution of the key signals, i.e., the first oval E0, second oval E1 and third oval E2 share a common center Vr and the same ratio "t" of shorter axis length vs. longer axis length, and E1 surrounds E0, E2 surrounds E1. As shown in FIG. 11, oval bodies E0 and E1 having respective shorter axis lengths "Ar" and "Ar+Aw1" specify the distribution of mixing key signal Km. Oval body E0 and oval body E2 having a shorter axis length "Ar+Aw1+Aw2" specify the distribution of color-canceling key signal Kc. In other words, what the user should do is just to set parameter Aw2 which specifies oval body E2 besides parameters "Ar", "Aw", and "t" which specify the distribution of mixing key signal Km.

As such, the video mixing apparatus in accordance with this third embodiment specifies the key-signal-distribution with the oval body planes defined in the three-dimensional space. Therefore, a boundary, which can separate properly a foreground object component from a screen component, can be set, and as a result, videos can be mixed with less degradation of the picture quality. In addition to the parameters for two oval bodies E0 and E1, which specify the distribution of mixing key signal Km, a parameter for oval body E2 surrounding the two oval bodies is only to be set, thereby specifying the distribution of color-canceling key signal Kc. The user, therefore, can operate the apparatus with ease.

Mixing processor 1003 carries out a mixing process—based on key signal K supplied from key signal generator 1001 and screen signal Vx supplied from screen signal generator 1002—following formulas (5), thereby generating mixed video signal Vm.

In this embodiment, mixed calculations shown by formulas (5) are used, but not limited to formulas (5), and multiplication key type mixed calculations shown by formulas (17) can be used with the same result.

Y component: $My = KmSy + (1-Km)Zy$ (17a)

Cb component: $Mcb = Km(Scb - (1-Kc)Rcb) + (1-Km)Zcb$ (17b)

Cr component: $Mcr = Km(Scr - (1-Kc)Rcr) + (1-Km)Zcr$ (17c)

In this embodiment, the key signal distribution is formed by three oval bodies which share a common center and also have the same ratio of shorter axis length vs. longer axis length. It is not limited to these oval bodies, but the key signal distribution can be formed with the same result by another three oval bodies having different centers and different ratios of shorter axis length vs. longer axis length.

In this case, the first and second oval bodies specify the distribution of the mixing key signal, and the second and third oval bodies specify the distribution of the color-canceling key signal.

As discussed above, according to the present invention, the key signal distribution is formed based on the oval body's face defined in the three-dimensional space. The key signal—properly separating the foreground object component from the screen component—is selected with ease and generated. As a result, mixing videos with less degradation of picture quality is obtainable.

A screen signal suitable to each pixel of a source video signal is generated and used as a vector subtracting from the source signal. Therefore, a screen component including noises can be removed.

What is claimed is:

1. A video mixing apparatus taking out a foreground object component from a source video signal obtained by shooting an object in front of a monochromatic screen, and fitting the object component into a background video signal, said apparatus comprising:

a key signal generator for setting a key signal distribution formed by a first oval body surrounding a reference color of the screen in a three-dimensional color space and a second oval body surrounding the first oval body, and for generating a mixing key signal according to a positional relation among the source video signal, the first oval body and the second oval body in the key signal distribution; and a mixing processor for taking out the foreground object component by the mixing key signal, and for mixing the object component with the background signal; and a screen signal generator for generating a screen signal by using the source video signal and the screen reference color, the screen signal indicating a screen component included in the source video signal, wherein said key signal generator generates the mixing key signal by using the source video signal and the screen reference color, and said mixing processor subtracts the screen signal from the source video signal based on the mixing key signal to obtain the foreground object component and the foreground object component is mixed with the background video signal based on the mixing key signal; and wherein said screen signal generator outputs (i) the source video signal as the screen signal when the source video signal is inside the first oval body, and (ii) a coordinates value as the screen signal when the source video signal is outside the first oval body, where the coordinates is a cross point of the first oval body and a vector starting from the screen reference color toward the source video signal.

2. The video mixing apparatus of claim 1, wherein a base clip level is a distance from the reference color to a cross point where the first oval body crosses with a vector starting from the reference color toward the source video signal, a peak clip level is a distance from the reference color to a cross point where the second oval body crosses with a vector starting from the reference color toward the source video signal, and the mixing key signal is a value responsive to a distance between the source video signal and the reference color, the value is saturated at the base clip level and the peak clip level with respect to the distance.

3. The video mixing apparatus of claim 1, wherein the first and second oval bodies share a common center of the reference color of the screen, and the first and second oval bodies are similar in shape.

4. The video mixing apparatus of claim 1, wherein said key signal generator sets a third oval body surrounding the second oval body in the key signal distribution, generates a color-canceling key signal-canceling a screen color component included in the source video signal-according to a positional relation among the source video signal, the first oval body and the third oval body in the key signal distribution, and subtracts a screen color component from the foreground object component by the color-canceling key signal, so that the foreground object component is mixed with the background video signal.

5. A method of mixing videos by taking out a foreground object component from a source video signal obtained by shooting an object in front of a monochromatic screen, and fitting the object component into a background video signal, said method comprising the steps of:

(a) setting a first oval body, surrounding a reference color of the screen, in a three-dimensional color space;

(b) setting a key signal distribution formed by a second oval body surrounding the first oval body and the first oval body;

(c) generating a mixing key signal based on a positional relation among the first oval body, the second oval body and the source video signal in the key signal distribution by using the source video signal and a screen reference color;

(d) generating a screen signal indicating a screen component included in the source video signal by using the source video signal and the screen reference color;

(e) obtaining the foreground object component by subtracting the screen signal from the source video signal based on the mixing key signal; and (f) mixing the foreground object component with the background signal based on the mixing key signal, wherein step (d) includes the steps of:

(d-1) outputting the source video signal as the screen signal when the source video signal is inside the first oval body, and (d-2) outputting a coordinates value as the screen signal when the source video signal is outside the first oval body, where the coordinates is a cross point of the first oval body and a vector starting from the screen reference color toward the source video signal.

6. The method of mixing videos of claim 5, wherein step (c) includes the steps of:

(c-1) setting a distance as a base clip level, where the distance spans between the reference color and a cross point of the first oval body and a vector starting from the reference color toward the source video signal;

(c-2) setting a distance as a peak clip level, where the distance spans between the reference color and a cross point of the second oval body and a vector starting from the reference color toward the source video signal; and (c-3) setting a value responsive to a distance between the source video signal and the reference color as the mixing key signal, where the value is saturated at the base clip level and the peak clip level with respect to the distance.

7. The method of mixing videos of claim 5, wherein the first and second oval bodies share a common center of the reference color of the screen, and the first and second oval bodies are similar in shape.

8. The method of mixing videos of claim 5 further comprising the steps of:

(g) setting a third oval body surrounding the second oval body in the key signal distribution; and (h) generating a color-canceling key signal-canceling a screen color component included in the source video signal-according to a positional relation among the source video signal, the first oval body and the third oval body in the key signal distribution, wherein step (e) includes a step of subtracting the screen color component from the foreground object component by the color-canceling key signal for the object to be mixed with the background video signal.

9. A video mixing apparatus taking out a foreground object component from a source video signal obtained by shooting an object in front of a monochromatic screen, and fitting the object component into a background video signal, said apparatus comprising:

a key signal generator for setting a key signal distribution formed by a first oval body surrounding a region where a reference color of the screen is distributed in a three-dimensional color space and a second oval body surrounding the first oval body, and for generating a mixing key signal according to positional a relation among the source video signal, the first oval body and the second oval body in the key signal distribution; and a mixing processor for taking out the foreground object component by the mixing key signal, and for mixing the object component with the background signal;

wherein said key signal generator sets a third oval body surrounding the second oval body in the key signal distribution, generates a color-canceling key signal-canceling a screen color component included in the source video signal-according to a positional relation among the source video signal, the first oval body and the third oval body in the key signal distribution, and subtracts a screen color component from the foreground object component by the color-canceling key signal, so that the foreground object component is mixed with the background video signal.

10. The video mixing apparatus of claim 9, wherein a base clip level is a distance from the reference color to a cross point where the first oval body crosses with a vector starting from the reference color toward the source video signal, a peak clip level is a distance from the reference color to a cross point where the second oval body crosses with a vector starting from the reference color toward the source video signal, and the mixing key signal is a value responsive to a distance between the source video signal and the reference color, the value is saturated at the base clip level and the peak clip level with respect to the distance.

11. The video mixing apparatus of claim 9, wherein the first and second oval bodies share a common center of the reference color of the screen, and the first and second oval bodies are similar in shape.

12. A method of mixing videos by taking out a foreground object component from a source video signal obtained by shooting an object in front of a monochromatic screen, and fitting the object component into a background video signal, said method comprising the steps of:

(a) setting a first oval body, surrounding a region where a reference color of the screen is distributed, in a three-dimensional color space;

(b) setting a key signal distribution formed by a second oval body surrounding the first oval body and the first oval body;

(c) generating a mixing key signal based on a positional relation among the first oval body, the second oval body and the source video signal in the key signal distribution;

(d) taking out the foreground object component by the mixing key signal;

(e) mixing the object component with the background signal, (f) setting a third oval body surrounding the second oval body in the key signal distribution; and (g) generating a color-canceling key signal-canceling a screen color component included in the source video signal-according to a positional relation among the source video signal, the first oval body and the third oval body in the key signal distribution, wherein step (e) includes a step of subtracting the screen color component from the foreground object component by the color-canceling key signal for the object to be mixed with the background video signal.

13. The method of mixing videos of claim 12, wherein step (c) includes the steps of:

(c-1) setting a distance as a base clip level, where the distance spans between the reference color and a cross point of the first oval body and a vector starting from the reference color toward the source video signal;

(c-2) setting a distance as a base clip level, where the distance spans between the reference color and a cross point of the second oval body and a vector starting from the reference color toward the source video signal; and (c-3) setting a value responsive to a distance between the source video signal and the reference color as the mixing key signal, where the value is saturated at the base clip level and the peak clip level with respect to the distance.

* * * * *

UNITED STATES PATENT AND TRADEMARK OFFICE
CERTIFICATE OF CORRECTION

PATENT NO. : 6,927,803 B2
DATED : August 9, 2005
INVENTOR(S) : Naoki Toyama et al.

It is certified that error appears in the above-identified patent and that said Letters Patent is hereby corrected as shown below:

Column 12,
Line 61, add the following:

-- 14. The method of mixing videos of Claim 12, wherein the first and second oval bodies share a common center of the reference color of the screen, and the first and second oval bodies are similar in shape. --.

Signed and Sealed this

Seventh Day of March, 2006

JON W. DUDAS
*Director of the United States Patent and Trademark Office*